United States Patent
Peresada et al.

(10) Patent No.: US 7,237,327 B2
(45) Date of Patent: Jul. 3, 2007

(54) APPARATUS FOR MOUNTING A PLURALITY OF MAGNET SEGMENTS ON A BACK RING

(75) Inventors: Gary L. Peresada, Torrington, CT (US); Carey L. Linkovich, Avon, CT (US); Russel H. Marvin, Goshen, CT (US)

(73) Assignee: The Bergquist Torrington Company, Torrington, CT (US)

( * ) Notice: Subject to any disclaimer, the term of this patent is extended or adjusted under 35 U.S.C. 154(b) by 191 days.

(21) Appl. No.: 11/215,920

(22) Filed: Aug. 24, 2005
(Under 37 CFR 1.47)

(65) Prior Publication Data

US 2007/0050970 A1   Mar. 8, 2007

Related U.S. Application Data

(62) Division of application No. 10/674,832, filed on Sep. 29, 2003, now Pat. No. 6,974,522.

(51) Int. Cl.
*H02K 15/03* (2006.01)

(52) U.S. Cl. ............................. 29/732; 29/596; 29/598
(58) Field of Classification Search ................. 29/596, 29/598, 602.1, 607, 609, 732–736; 156/293; 310/42
See application file for complete search history.

(56) References Cited

U.S. PATENT DOCUMENTS 3,663,850 A * 5/1972 Phelon ........................ 310/153
4,011,120 A * 3/1977 Aggen ......................... 156/74

FOREIGN PATENT DOCUMENTS

JP        2000152541 A  * 5/2000

\* cited by examiner

*Primary Examiner*—A. Dexter Tugbang
*Assistant Examiner*—Livius R. Cazan
(74) *Attorney, Agent, or Firm*—Haugen Law Firm PLLP

(57) ABSTRACT

A method and apparatus for assembling permanent magnet segments and a back ring wherein a fixture hold segments in circumaxially spaced relationship, adhesive is applied to the segments, externally from pressure sensitive adhesive tape and the fixture then expands to urge the segments into firm bonding engagement with the back ring.

10 Claims, 5 Drawing Sheets

APPARATUS FOR MOUNTING A PLURALITY OF MAGNET SEGMENTS ON A BACK RING

This is a divisional application of U.S. patent application Ser. No. 10/674,832 filed Sep. 29, 2003, now U.S. Pat. No. 6,974,522.

BACKGROUND OF INVENTION

In the manufacture of permanent magnet motors, magnet segments are conventionally secured in circumaxially spaced relationship on the interior surfaces of cylindrical back rings in a manual operation employing a two-part epoxy. The assembled magnet segments and rings are then conventionally encapsulated in an injection molding operation.

While generally satisfactory, the procedure is a slow and tedious step in the manufacturing process and the epoxy is both expensive and difficult to apply.

Accordingly, it is a general object of the present invention to provide an efficient and more expeditious method and apparatus for assembling magnet segments on a back ring.

A further object of the invention is to provide an assembly method and apparatus which requires minimal manual intervention and which exhibits a high degree of consistency and repeatability in the results achieved.

SUMMARY OF THE INVENTION

In fulfillment of the aforementioned objects and in accordance with the present invention, a rotatable expandable and contractible fixture is provided and the magnet segments are releasably secured on and about the fixture in circumaxially spaced relationship with their exterior surfaces outwardly exposed and provided with an arcuate configuration substantially conforming to that of the interior surface of the back ring. Preferably, a liner backed pressure sensitive adhesive tape known as an "adhesive transfer tape" is then employed with a means for applying the adhesive sequentially to the magnet segments during fixture rotation. The liner is separated during application of the adhesive to the segments. Relative axial movement is then effected between the fixture carrying the segments and the back ring to enter the former within the latter. Expansion of the fixture follows urging the magnet segments firmly into engagement with the interior surface of the back ring and bonding them in position thereon. The fixture is thereafter contracted and relative axial movement is again effected between the fixture and the back ring to remove the former from the interior of the ring assembly.

Apparatus employed in the practice of the foregoing method in addition to the fixture and adhesive applying means which preferably comprises an application roller includes a vacuum source for releasably securing the magnet segments on the fixture, a rotary drive means preferably in the form of a step motor for the fixture, locating surfaces on the fixture and an opposing device resiliently urging the segments against the surfaces to precisely locate the same, a liner take-up roll, and other auxiliary devices.

DRAWINGS

DESCRIPTION OF PREFERRED EMBODIMENT

Figure 1:
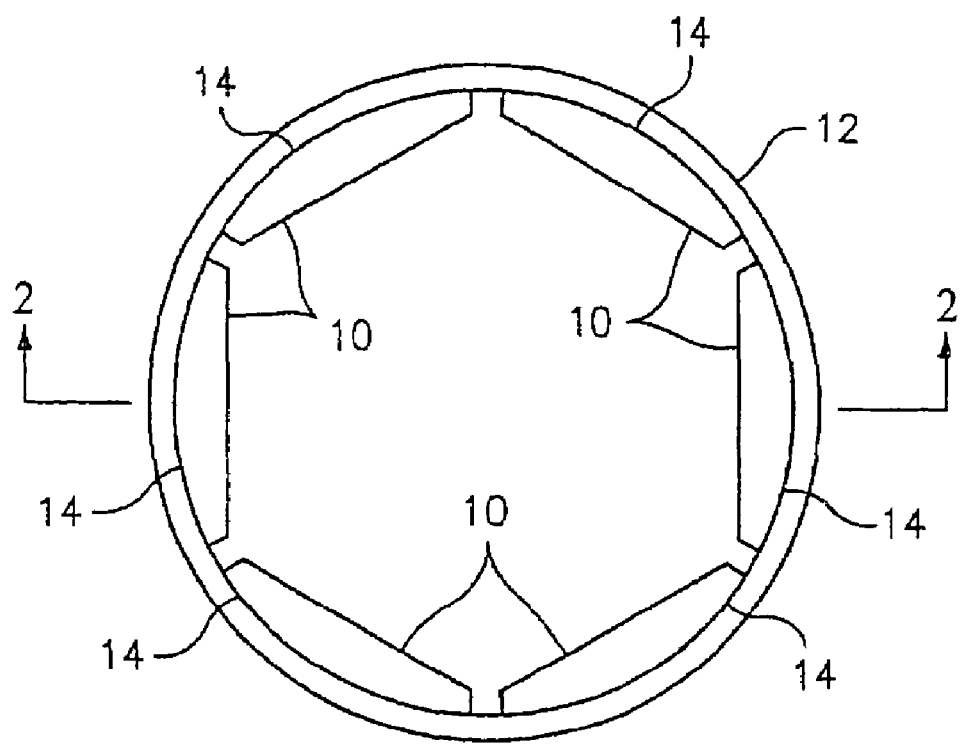
FIG. 1 is a top view of an assembled back ring and six (6) magnet segments.
Figure 2:
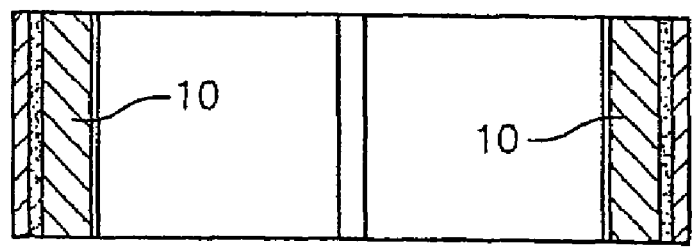
FIG. 2 is a cross sectional view taken generally as indicated at 2-2 in FIG. 1

Referring particularly to FIGS. 1 and 2, it will be observed that six (6) permanent magnet segments 10,10 are provided in the preferred embodiment of the invention shown. The magnet segments 10,10 are equally spaced circumaxially as shown and are mounted on the interior surface of a cylindrical back ring 12. The segments may be metallic or ceramic and the back ring is conventionally of iron. Exterior surfaces 14,14 of the magnet segments are arcuate to conform substantially with the interior surface of the back ring 12. The interior surfaces of the segments are flat as shown and presently preferred for engagement with similar flat surfaces 16,16 on a fixture 18 best illustrated in FIG. 3.

The fixture 18 has six (6) flat surfaces 16,16 respectively for receiving the six (6) magnet segments 10,10. Each of the flat surfaces has a pair of vacuum ports 20,20 connected by suitable conduits (not shown) to a vacuum source which may comprise a conventional vacuum pump at 22. An appropriate computer controlled valve system (not shown) provides for the establishment and removal of a vacuum at the ports 20,20 suitably timed respectively to secure and release magnet segments from the surfaces 16,16. A step motor 24 rotates the fixture also in timed relationship with other elements of the apparatus under computer control.

Disposed within and forming a part of the fixture 18 is an axially movable collet-like member indicated generally at 26 and which has six (6) flexible fingers 28,28. The fingers co-operate with radially inwardly biased pins 30,30 which project through openings 32,32 in the fixture 18 to engage magnet segments and urge the same outwardly for engagement with and bonding to an associated back ring. A pneumatic cylinder 34 operates the collet axially under computer control, to expand and contract the pins as required.

Figure 3:
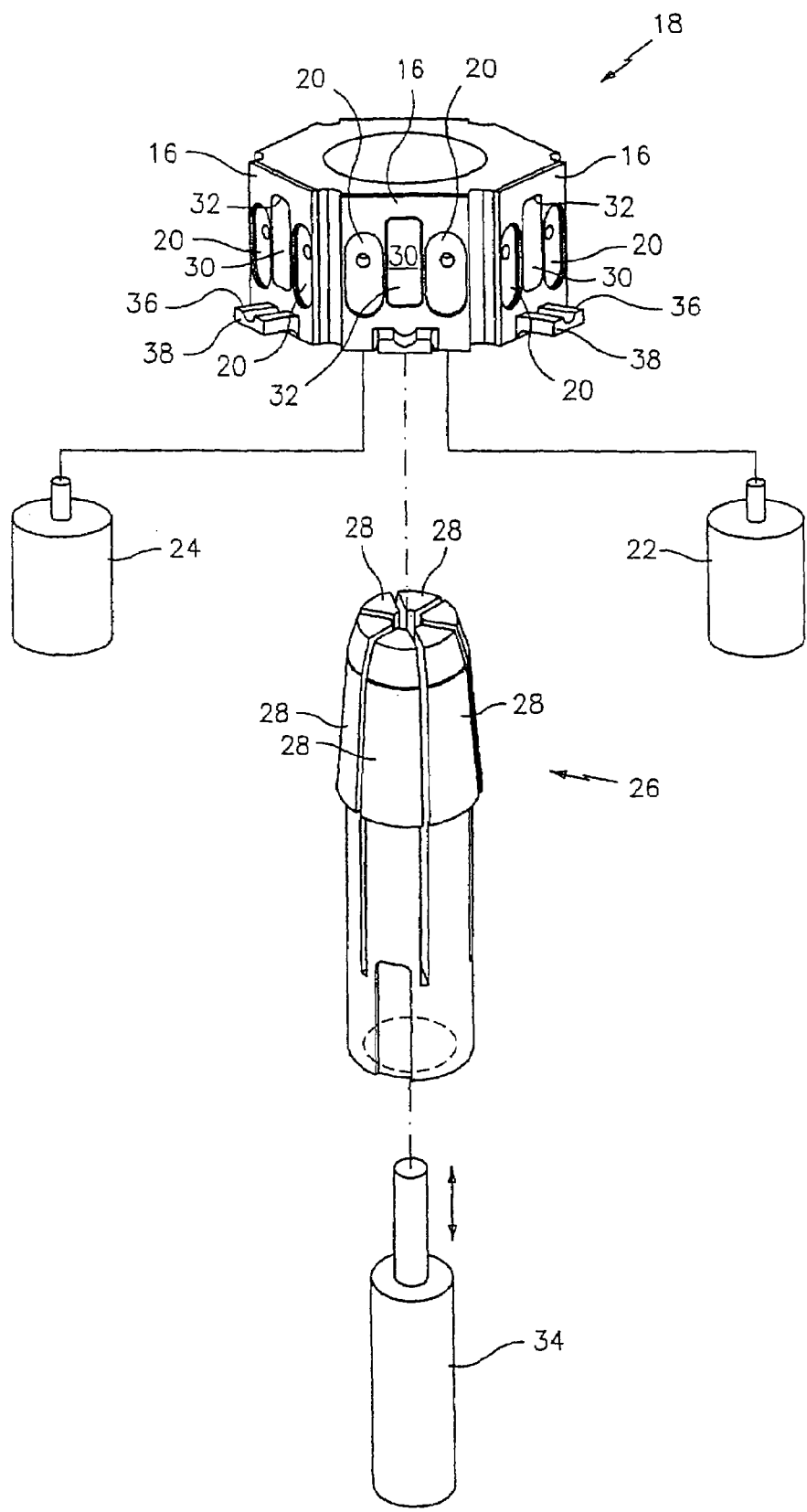
FIG. 3 is a somewhat schematic exploded perspective showing a rotatable fixture, a drive motor and vacuum pump therefore, and a collet-like expander associated therewith.
Figure 7:
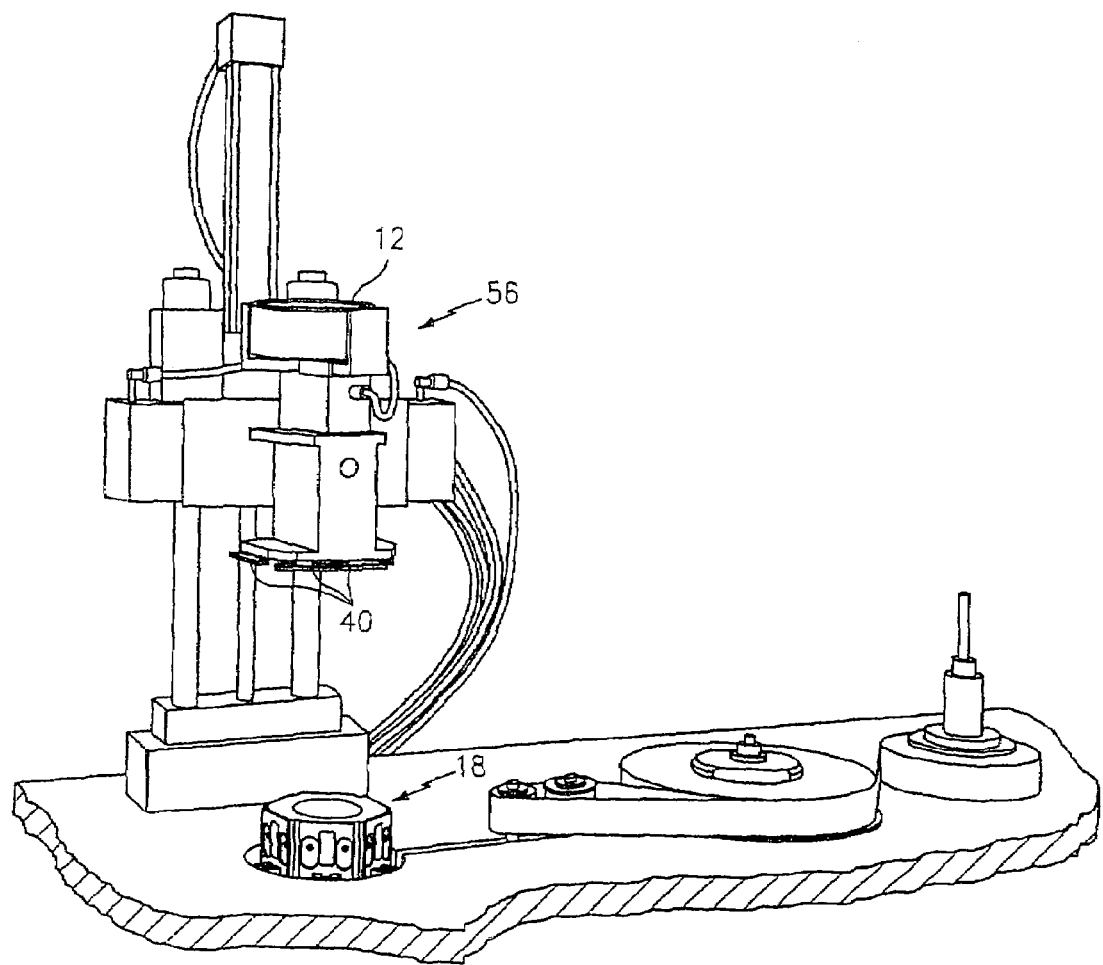
FIG. 7 is a perspective view showing a rotatable turret carrying a "bumper" for axially locating the segments and a gripper for placing back rings about fixtures carrying adhesive bearing segments.

A locating device best illustrated in FIGS. 3 and 7 includes radially extending locating surfaces 36,36 on six (6) small projections 38,38 on the fixture 18, one for each magnet segment 10,10. At an opposite end of the fixture six (6) resiliently mounted "bumpers" 40,40 are moveable axially toward and away from the segments to urge them into engagement with the locating surfaces 36,36 and precisely position the same axially. The bumpers may also be pneumatically operated under computer control.

Figure 4:
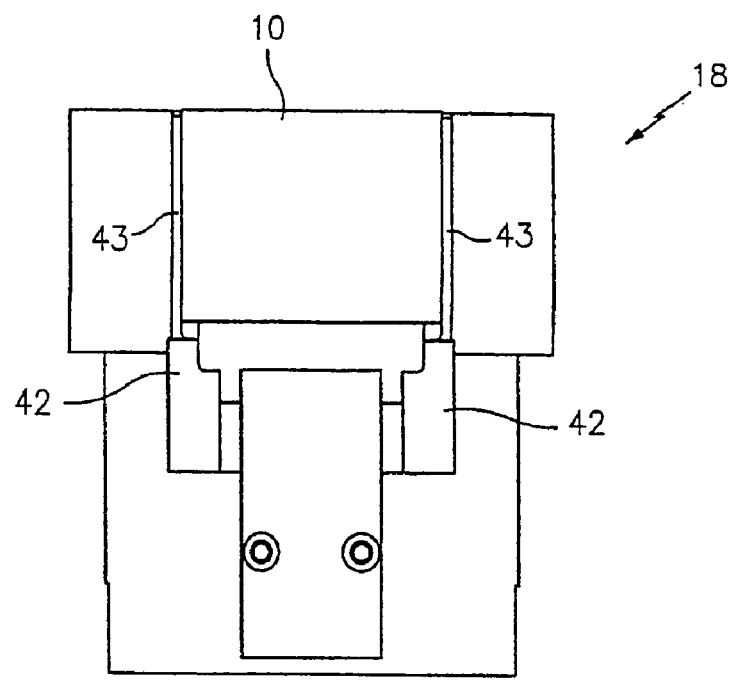
FIG. 4 is a side view showing the fixture of FIG. 3 with a single magnet segment mounted thereon.
Figure 5:
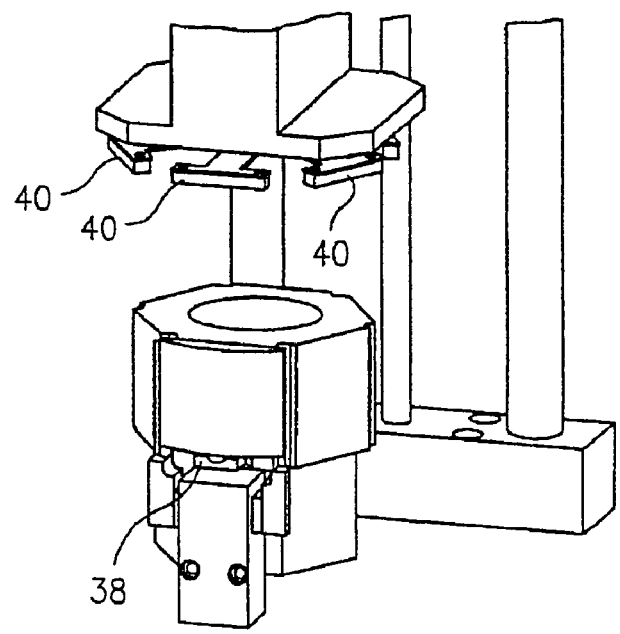
FIG. 5 is a somewhat schematic perspective view showing the fixture with a single magnet segment thereon and a device which operates to precisely locate the segments axially on the fixture.

FIG. 4 shows a single magnet segment 10 mounted on a fixture 18 and engaged by a pair of "grippers" 42,42 which have long narrow fingers 43,43 operable to locate and hold the segment. The "grippers" may also be pneumatically operated under computer control.

Figure 6:
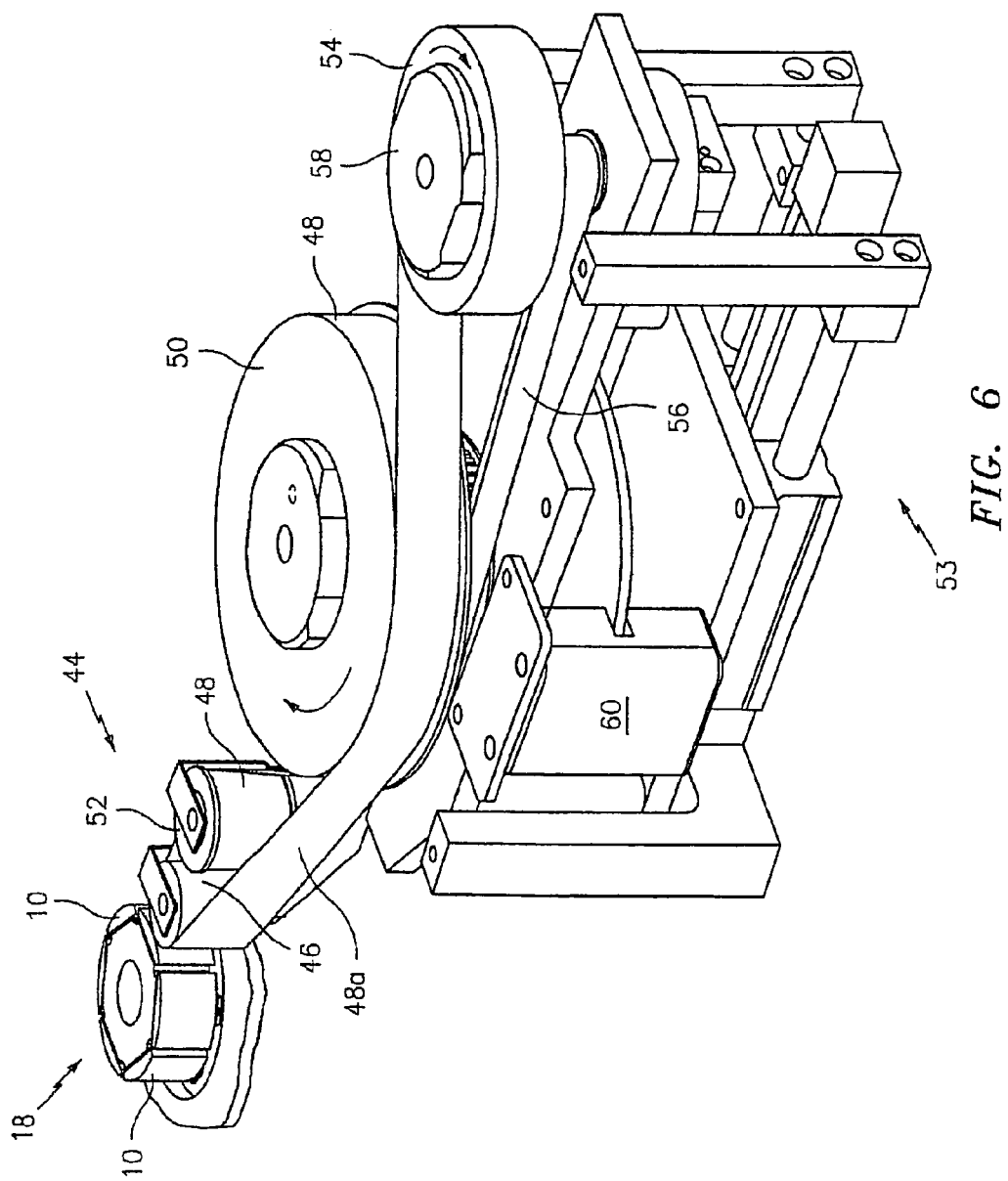
FIG. 6 is a somewhat schematic perspective view showing the majority of the major components of the apparatus of the invention.

In FIGS. 6, and 7 components of the apparatus of the invention are illustrated. A fixture 18 with six (6) magnet segments mounted thereon is positioned adjacent an adhesive applying means indicated generally at 44 and comprising an application roller 46 about which an adhesive liner tape 48 is directed from an adhesive storage reel 50. An intermediate roller 52 directs the tape from the storage reel 50 to the application roller 46 where it is resiliently urged against the magnet segments by pneumatic means indicated generally at 53. Friction created at the interface between the adhesive bearing tape and the rotating magnet segments serves to drive the apparatus with the tape being thus drawn from its storage reel 50 and about the rolls 46 and 52. A take-up reel 54 receives the liner 48a which separates from the adhesive at the interface between the magnet segments and tape at the application roll 46 and is over driven by a timing belt 56 extending from the friction driven application roller. A small friction clutch 58 accommodates the variation in speed as the tape reel 50 becomes smaller and the liner take-up reel 54 becomes larger.

In operation, the fixture is rotated through 345° and then stopped. A pneumatically operated brake 60 stops the tape dispensing reel 50 and the fixture 18 is then rotated an additional fifteen degrees (15°) to break the adhesive. The application roller 46 then backs off. At this point, it should be noted that a blank area is thus created on the liner 48a. This of course results in a loss of the necessary friction to rotate the application roller 46, supply reel 50 etc. Accordingly, an index arm over with a needle-roller clutch is provided to advance the tape as the application roller moves forward for a succeeding adhesive applying sequence.

Once the adhesive has been applied, the back ring and the fixture carrying the segments are moved relatively in an axial direction to assemble the elements as best illustrated in FIG. 7. Turret 54 is rotatable and movable vertically to alternately present the "bumpers" 40,40 and a back ring gripper 56 to the fixture 18. As shown, the "bumpers" 40,40 are elevated prior to a segment loading operation. They are subsequently lowered to precisely locate the segments and then raised prior to turret rotation. When the turret has been rotated, the back ring 12 is placed about the adhesive carrying segments and the collet 26 urges the pins 32,32 outwardly and the segments against the back ring to bond the same in the desired positions thereon.

As indicated above, the assembly may then be over molded in an injection molding operation.

In practicing the method of the invention with the afore described apparatus, the segments are mounted on the fixture, adhesive is applied to the segments, the fixture carrying the segments is assembled with the back ring, and the segments are urged into firm bonding engagement with the ring.

The invention claimed is:

1. Apparatus for assembling a plurality of magnet segments on an interior surface of a cylindrical back ring for incorporation in a permanent magnet electric motor, the magnet segments each having an arcuate outer surface substantially conforming to the interior surface of the back ring, comprising an expandable and contractible fixture adapted to receive and hold the magnet segments in the desired circumaxially spaced arrangement with their exterior surfaces exposed, a supply of adhesive tape, a means for applying the adhesive from the tape sequentially to the outer surface of the magnet segments by rotating the fixture, a means for pressing the segments bearing adhesive against the interior surface of the back ring by expanding the fixture so as to move the magnet segments radially outwardly and thus bonding the magnet segments to the back ring, and contracting the fixture to enable withdrawal of the fixture from the ring and segments.

2. The apparatus according to claim for assembling a plurality of magnet segments on an interior surface of a cylindrical back ring for incorporation in a permanent magnet electric motor as set forth in claim 1 wherein a means for rotatably driving the fixture is provided, and wherein the fixture is thus rotated to apply adhesive sequentially to the magnet segments.

3. The apparatus according to claim for assembling a plurality of magnet segments on an interior surface of a cylindrical back ring for incorporation in a permanent magnet motor as set forth in claim 2 wherein said adhesive applying means takes the form of an application roller about which the adhesive tape extends and a means for resiliently urging the roller toward the magnet segments.

4. The apparatus according to claim for assembling the adhesive a plurality of magnet segments on an interior surface of a cylindrical back ring for incorporation in a permanent magnet electric motor as set forth in claim 3 wherein the adhesive tape takes the form of an adhesive transfer tape having a liner which is separated from the adhesive as it is applied to the segments.

5. The apparatus according to claim for assembling a plurality of magnet segments on an interior surface of a cylindrical back ring for incorporation in a permanent magnet electric motor as set forth in claim 4 wherein a rotatably driven take-up roller is provided to receive the liner after separation of the same from the adhesive.

6. The apparatus according to claim for assembling a plurality of magnet segments on an interior surface of a cylindrical back ring for incorporation in a permanent magnet electric motor as set forth in claim 2 wherein axial locating surfaces are provided on the fixture and wherein a device is provided at an opposite end of the fixture to urge the magnet segments against said surfaces and thereby precisely locate the same axially.

7. The apparatus according to claim 6 wherein an axially movable rotatable turret is provided and carries said device for urging the magnet segments axially and a gripping device for holding the back ring, said turret being rotated and moved axially to alternately urge the magnet segments axially against their respective axial locating surfaces and to place the back ring about the fixture loaded with the adhesive-carrying magnet segments.

8. The apparatus according to claim for assembling a plurality of magnet segments on an interior surface of a cylindrical back ring for incorporation in a permanent magnet electric motor as set forth in claim 2 wherein a vacuum means is provided for releasably securing the magnet segments on the fixture.

9. The apparatus according to claim for assembling a plurality of magnet segments on an interior surface of a cylindrical back ring for incorporation in a permanent magnet electric motor as set forth in claim 8 wherein individual grippers are provided respectively for each magnet segment to assist the vacuum means in properly positioning the magnet segments on the fixture.

10. The apparatus according to claim for assembling a plurality of magnet segments on an interior surface of a cylindrical back ring for incorporation in a permanent magnet electric motor as set forth in claim 2 wherein the fixture includes a collet like device operable to expand and force the magnet segments against the interior surface of the back ring, and thereafter operable to contract and release the same.

* * * * *